US012748639B2

(12) United States Patent
Aspro et al.

(10) Patent No.: US 12,748,639 B2
(45) **Date of Patent: *Sep. 29, 2026**

(54) AUTOMATED API CODE GENERATION

(71) Applicant: THE TORONTO-DOMINION BANK, Toronto (CA)

(72) Inventors: Salvatore Aspro, Vaughan (CA); George Wright, Carleton, MI (US)

(73) Assignee: The Toronto-Dominion Bank, Toronto (CA)

( * ) Notice: Subject to any disclaimer, the term of this patent is extended or adjusted under 35 U.S.C. 154(b) by 969 days.

This patent is subject to a terminal disclaimer.

(21) Appl. No.: 17/582,584

(22) Filed: Jan. 24, 2022

(65) Prior Publication Data

US 2022/0147326 A1 May 12, 2022

Related U.S. Application Data

(63) Continuation of application No. 16/808,215, filed on Mar. 3, 2020, now Pat. No. 11,269,694.

(51) Int. Cl.

*G06F 9/54* (2006.01)
*G06F 8/10* (2018.01)
*G06F 8/30* (2018.01)

(52) U.S. Cl.

CPC .................. *G06F 9/54* (2013.01); *G06F 8/10* (2013.01); *G06F 8/30* (2013.01)

(58) Field of Classification Search

CPC ................. G06F 9/54; G06F 8/10; G06F 8/30
See application file for complete search history.

(56) References Cited

U.S. PATENT DOCUMENTS

2007/0286486 A1 12/2007 Goldstein
2014/0040923 A1 2/2014 Tran
2015/0154012 A1* 6/2015 Wolfram .................. G06F 8/75 717/176
2018/0089005 A1* 3/2018 Green ..................... G06F 9/547
2019/0196890 A1* 6/2019 Bucchi .................. G06F 16/951
2020/0364033 A1* 11/2020 Lester ........................ G06F 9/54
2021/0026710 A1* 1/2021 Gómez ..................... G06F 8/36

OTHER PUBLICATIONS

CIPO Examination Report issued in CA Application 3,099,575 mailed Aug. 22, 2023, 4 pages.

* cited by examiner

*Primary Examiner* — Kevin L Young
*Assistant Examiner* — Kimberly L Jordan
(74) *Attorney, Agent, or Firm* — Hopewell IP, P.C.

(57) ABSTRACT

An API generation system can be used to generate complete (or almost complete) APIs in response to received requests for new or modified APIs. Received API generation requests can include API descriptive data which is augmented to generate a set of data requirements defining one or more inputs and outputs for the API. The API functions can be mapped to one of a set of reference data models defining data types as used by the backend system, and the mappings used to automatically generate an API design defining input and output parameters for each API function of the requested API. The API generation system then assembles a code foundation for the requested API based on a set of software components implementing a portion of the API function and generates API source code based on the code foundation to complete the requested API.

22 Claims, 5 Drawing Sheets

AUTOMATED API CODE GENERATION

CROSS-REFERENCE TO RELATED APPLICATION

This application is a continuation of U.S. application Ser. No. 16/808,215, filed Mar. 3, 2020, the contents of which are hereby incorporated by reference.

BACKGROUND

This disclosure generally relates to APIs and, in particular, to automatic generation of API design and source code.

Generally, APIs (Application Programming Interfaces) are useful in simplifying computer programs and improving communications between different computing systems. A correctly designed API can facilitate communication of specific data between disparate computing systems via an array of possible API functions with defined inputs and outputs. However, when a backend system accessible by one or more APIs needs to be able to communicate new types of data or data in a new format (for example, when the backend system is expected to respond to API calls from a new requesting system), often a new API is needed to accept new or differently formatted input and/or provide similarly different output. Often, however, the objective for an API is generally or poorly described and the description of the data to be handled by the API is initially general or incomplete. Generating an operable API from this description includes creating an API design of the functional descriptions/documentation of the API and source code implementing the API for each function of the API. However, generating a new API, even one similar to a previously implemented API, can be a repetitive and tedious process, and therefore time consuming for a human API developer. Human API developers can also be prone to errors or inconsistency within an API (and across subsequently implemented APIs), especially when dealing with a backlog of repetitive APIs. In some applications, an entity operating a backend system may be exposed to a large volume of requests to develop new or modified APIs for access to the backend system which are inefficiently addressed by even a team of human API developers.

SUMMARY

An API generation system can be used to generate complete (or almost complete) APIs in response to received requests for new or modified APIs using AI techniques, processes, or algorithms. An API or "Application Programming Interface" refers to a set of a functions and associated inputs and outputs for interfacing with a particular system. Received API generation requests (i.e., requests to create a new API) can include API descriptive data describing desired characteristics and functions of the requested API, from which the API generation system extracts partial data requirements for the API, which it then augments to generate a set of data requirements defining one or more inputs and outputs for each API function of the API. The API functions can be mapped to one of a set of reference data models defining data types as used by the backend system, and the mappings used to automatically generate an API design defining input and output parameters for each API function of the requested API.

The API generation system then assembles a code foundation for the requested API based on the API design and a set of software components, where each component implements a portion of the API function. Finally, the API generation system generates API source code based on the code foundation to complete the requested API.

Figure 1:
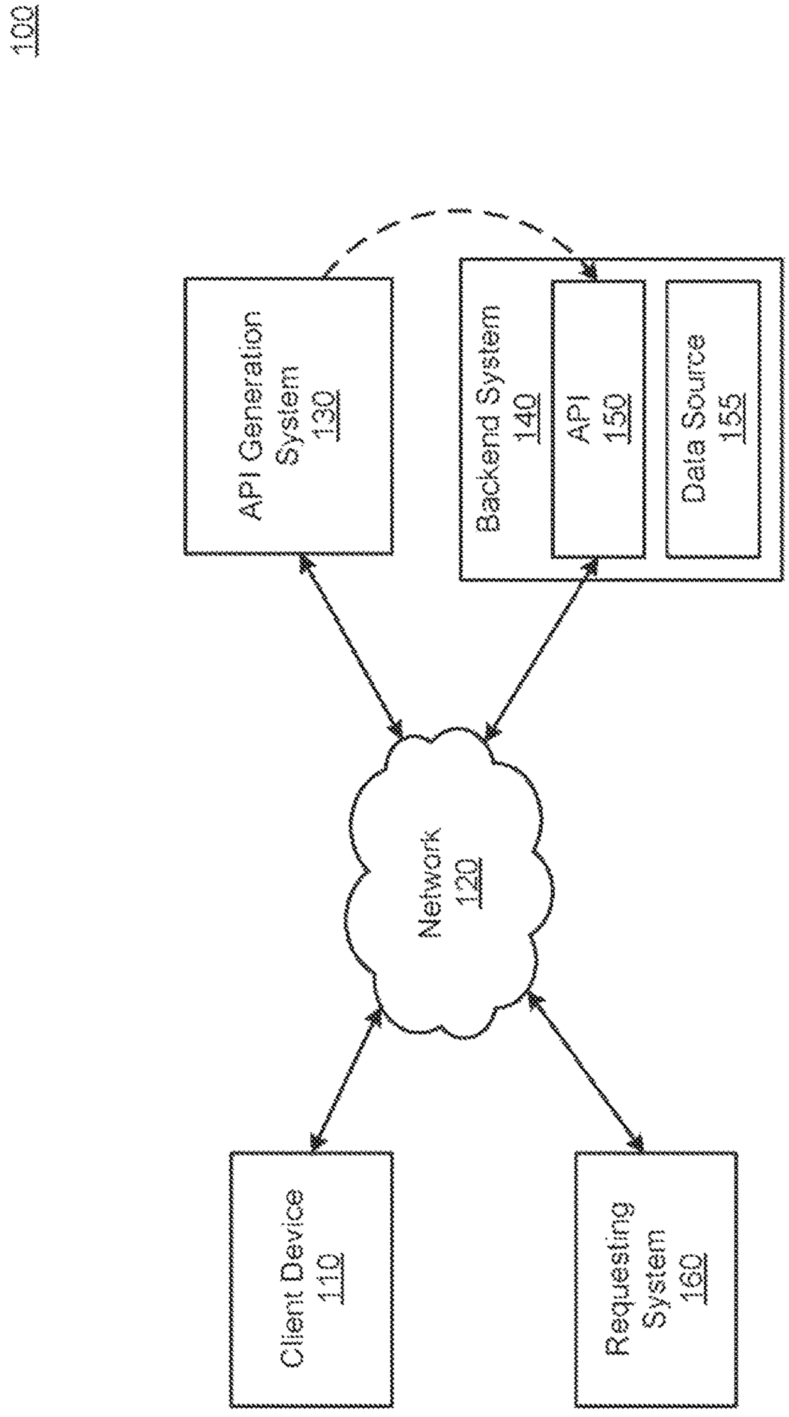
FIG. 1 is a block diagram of a system environment in which an API generation system operates, according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An Application Programming Interface (API) generation system can generate code for an API to be implemented on a backend system (e.g., the system performing the API) based on received information about the desired API. An API includes a set of API functions, each operating on a defined input to produce an expected output. An API implemented on a backend system can be accessed by a requesting system (e.g., the system accessing the API) through an API call identifying an API function and providing the required input. An API as represented in the API generation system can include both functional specifications/documentation of the API and the code for implementing the API functions, according to some embodiments.

In some implementations, the API generation system creates an API design (e.g., a specification or other documentation) listing the API functions of the API and an expected format and/or schema of inputs and outputs to each API function. This API design may include documentation for use by a human reviewing the API to understand its functions and data and may also include machine-understandable API function descriptions to guide use of the API by a requesting system. For example, the API design can include an API specification, API description, and/or API documentation which lay out the outward facing aspects of the API such that an external system can interface with the API based on the API design. To implement the API functions, the API generation system may also create API source code which, when implemented on the associated backend system, performs the functions of the API (according to the API design). API source code associated with an API can be in any suitable language (such as JavaScript, Python, or Java).

To generate the API code, the API generation system 130 receives an incomplete requirements description for the API which may describe some aspects of the data to be used in the API as entered by users, for example, a description of the data to be provided by functions of the API. Since this information about the API data may be incomplete and only partially describe data interacted with by the API, the API generation system automatically determines a set of complete data requirements and identifies reference data models for the data types specified in the data requirements. The reference data types may describe the data fields, types, possible values, and other characteristics of the data specified in the data requirements. The API generation system may then use the reference data models and functions of the API to select components (e.g., particular software packages or implementing technologies or tools) for implementing the API functions and generate code for performing the functions using the selected components.

FIG. 1 is a block diagram of a system environment in which an API generation system operates, according to an embodiment. The environment 100 of FIG. 1 includes a client device 110, network 120, API generation system 130, backend system 140 including an API 150 and a data source 155, and a requesting system 160. Although the environment 100 shows one client device 110, one backend system 140, and one requesting system 160 for clarity, some embodiments include a plurality of client devices 110, backend systems 140, and/or requesting systems 160.

The client device 110 is a computing device capable of receiving user input as well as transmitting and/or receiving data via the network 120. In some embodiments, a client device 110 is a device having computer functionality, such as a mobile telephone, a smartphone, a server, or a laptop or desktop computer. In one embodiment, a client device 110 executes an application or web application allowing a user of the client device 110 to interact with the API generation system 130 over the network 120. For example, a client device 110 can send a request for a new API or for a modified version of an existing API (herein, an "API generation request") to the API generation system 130. In some embodiments, the API is created for the backend system 140 to provide for use by other systems, such as requesting system 160. For example, the API may be designed for the requesting system 160 to provide inputs for particular functions of the API and receive outputs of the API from the backend system 140.

The network 120 is a network or networking system comprising any combination of local area and/or wide area networks, using both wired and/or wireless communication systems. In one embodiment, the network 120 uses standard communications technologies and/or protocols to facilitate communication between the client device 110, the API generation system 130, the backend system 140, and the requesting system 160. For example, the network 120 can include communication links using technologies such as Ethernet, 3G, 4G, CDMA, WIFI, and Bluetooth. Data exchanged over the network 120 may be represented using any suitable format, such as hypertext markup language (HTML) or extensible markup language (XML). In some embodiments, all or some of the communication links of the network 120 may be encrypted using any suitable technique or techniques.

The API generation system 130 can be a server, server cluster, or cloud-based server system capable of generating an API for implementation on the backend system 140. In some embodiments, the API generation system 130 receives an API generation request for a new or modified API from the client device 110, automatically analyzes the received request to determine desired API functionality, and generates code for implementing the desired API functionality. In some embodiments, the API generation system 130 can be in communication with multiple client devices and generate multiple APIs (or API functions) in series or in parallel for implementation on one or more backend systems 140. The API generation system 130 may be used as a foundation for broader data standardization. The API generation system 130 will be discussed further in relation to FIG. 2.

The backend system 140 can a server, server cluster, or cloud-based server system for which an API 150 is generated by the API generation system 130. An API 150 of the backend system 140 can comprise one or more API functions which return a corresponding output to a received input.

An API 150 (including individual API functions within an API) can have an API design, which, as described above, defines the expected format/schema of inputs and outputs of the API or API function. For example, the API design for an API function can include a URI (Uniform Resource Identifier) specifying a format for a requesting system 160 to provide an API call for the API function. This format/schema may define the data types and acceptable parameters of inputs and outputs of an API function.

As shown in environment 100, a backend system 140 can comprise a data source 155, which may be a database, table, sensor, or other store or source of data accessible to the API 150. The data source 155 of FIG. 1 is shown as integrated into the backend system 140, however data sources 155 can also be other sources of data accessible to the backend system 140, such as an affiliated but separate database or data store, or a third party or public system the backend system 140 is able to access. API functions of an API 150 can retrieve, store, or modify data contained in a data source 155 (also referred to as "resources"). Each backend system 140 or data source 155 of a backend system 140 can be associated with a data definition outlining what data is contained within or accessible to the data source 155 or backend system 140. In some embodiments an API 150 can be restricted to be accessible only to internal systems affiliated with the backend system 140, or only to a set of trusted requesting systems 160. Alternatively, an API 150 can be a public API generally accessible any requesting system 160.

Although only one API 150 and data source 155 are shown in environment 100, the backend system 140 can include a plurality of APIs 150 and data sources 155. Each API 150 of the backend system 140 can include a different set of API functions (reflected by API source code based on different API designs), designed to interface with one or more requesting systems 160 and/or data sources 155. In some embodiments, an API 150 can be adapted to interact with a specific requesting system 160, for example, by accepting input and providing output in a format that the requesting system 160 can provide (for inputs) or expects (for outputs). In some embodiments, the API generation system 130 generates one or more APIs 150 that are later implemented on the backend system 140 to be accessible to one or more requesting systems 160 through the network 120.

In some embodiments, a requesting system 160 is a device having computer functionality, such as a mobile telephone, a smartphone, a server or server system, or a laptop or desktop computer. In one embodiment, a requesting system 160 executes an application or server environment allowing the requesting system 160 to interact with one or more API functions of an API 150 of the backend system 140. For example, the requesting system 160 can be a client database system using a specific API 150 to request information about a client account with the backend system 140 stored in the data source 155 of the backend system 140. As described above, the requesting system 160 can interact with the API 150 by providing specifically formatted inputs (API calls) according to the API design of the API 150.

Figure 2:
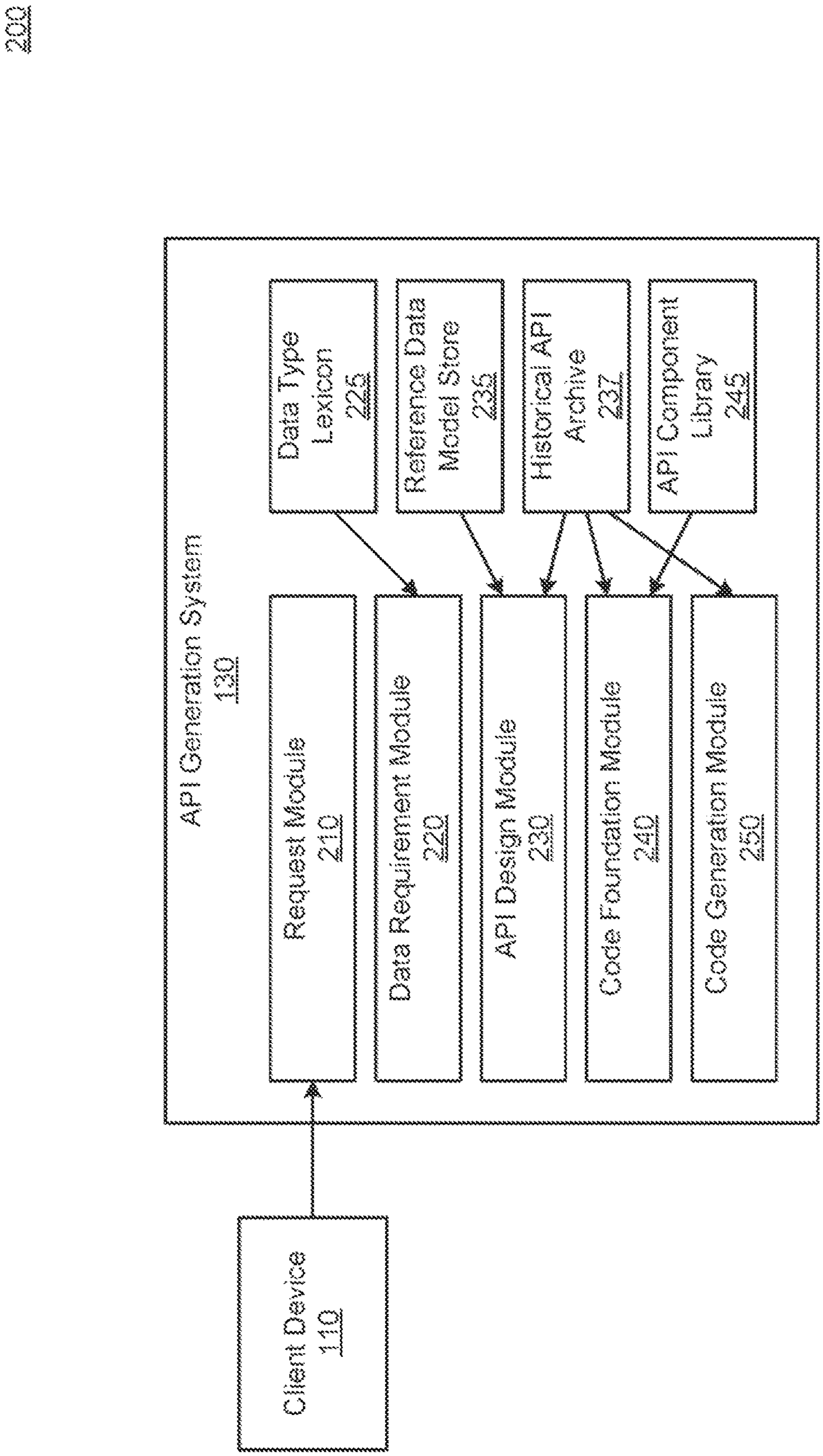
FIG. 2 is a block diagram of an API generation system, according to an embodiment.

FIG. 2 is a block diagram of an API generation system, according to an embodiment. The environment 200 shows a client device 110 in communication with the API generation system 130, which includes a request module 210, a data requirement module 220, API design module 230, a code foundation module 240, and a code generation module 250. In the embodiment of FIG. 2, the API generation system 130 also contains a data type lexicon 225, a reference data model store 235, a historical API store 237, and an API component library 245. In other embodiments, the API generation system 130 may include additional, fewer, or different modules and data stores for various applications. Conventional features such as network interfaces, security functions, load balancers, failover servers, management and network operations consoles, and the like are not shown so as to not obscure the details of the system architecture.

As described above, the API generation system 130 can receive a request for a new or modified API from a client device 110 (an a "API generation request"). In the embodiment of FIG. 2, any requests for a new or modified API are handled by the request module 210. API generation requests for a new or modified API (herein, the "requested API") can be received from a client device 110 as shown in FIG. 2, from an internal system or user associated with the backend system 140 or the API generation system 130, or be generated automatically by the API generation system 130. For example, an API generation request can be generated based on data from a database, a cloud storage system, or other system associated with the backend system 140 suggesting that a new API is needed. An API generation request received at the request module 210 can comprise metadata about the request (for example, information about the client device 110 sending the request) as well as a data requirement of the requested API. As used herein, the data requirement of a requested API defines a set of API functions (API calls) for implementation in the requested API as well as the desired input and output data for each API function of the requested API. In some embodiments, a received data requirement includes information about the functionality of each API function, such as a description of the relationship between the input and output of the API function. Input requirements of the data requirement can define the type of system that the requested API may receive data from, the format and characteristics of that data, such as structure, fields, and data types of the input data for each API function. Likewise, output requirements may describe the type of system the requested API may output data to and similar output data characteristics. For example, the data requirement for a simple API function can note that the API call for a particular function includes an account number and the API will respond to with an address associated with the account number. Data requirements received at the API generation system 130 can be preferred to be in a standardized format defined by the API generation system 130, according to some embodiments.

In some implementations, the request module 210 may receive an API generation request containing a vague or incomplete data requirement without all expected data for each API function (herein, a "partial data requirement"). For example, a partial data requirement can be in an unexpected format, may lack a full definition of desired input and output data for each API function (or possible API call), or the like. API generation requests received by the request module 210 can be manually generated by a user of the client device 110 and can therefore lack some expected elements of a data requirement, for example in cases of an API with many functions, a user drafting the new API generation request on the client device 110 may skip redefining data types or providing a full data requirement for repetitive but similar API functions on the assumption that the human programmer manually creating the new API based on the API generation request would intuitively be able to fill in the blanks or resolve ambiguities in the API generation request. After receiving an API generation request (for example, from a client device 110), the request module 210 can separate a partial data requirement for each API function from the API generation request and send the partial data requirement to the data requirement module 220 to begin the process of generating the requested API.

The data requirement module 220 can revise and/or augment a received a partial data requirement for an API function to generate a corresponding complete data requirement for the API function (as used herein, a data requirement in the expected format with all appropriate fields filled and data provided). In some implementations, normalizing received API generation requests to a set of complete data requirements (in a standardized format) enhances the ability of the API generation system 130 to generate an API reflecting in the desired functionality of the API generation request. For example, by improving the precision of the resulting data requirements and maintaining consistency in the definition and usage of data types and/or other terms. In some implementations, the data requirement module 220 can generate complete data requirements from received partial data requirements based on data type definitions and historical data requirements from previously implemented APIs.

In some implementations, the data type definitions and/or historical data requirements used by the data requirement module 220 to determine complete data requirements are stored in the data type lexicon 225. The data type lexicon 225 can be a store, database, or other data store containing data type definitions and/or examples of historical data requirements. A data type definition can comprise a set of terms, each associated with a specific data type, and a structure and/or set of expected fields for data of that data type. For example, the data type lexicon 225 can contain an entry for an "address" including a definition of an "address" data type with a series of fields defining a "street address," "postal code," and the like for the address. Similarly, the entry for an "email" in the data type lexicon 225 can be associated with an "email" data type with a single field for the email address. In some embodiments, the data type lexicon 225 further contains entries defining specific functionality available to an API, for example, by including definitions and/or standardized terms for common API functions (such as create, read, update, delete operations), as well as operations specific to the backend system 140 (for example, a subscription feature if offered by the backend system 140, or a specific named authentication process). Similarly, the data type lexicon 225 can contain entries labeling one or more entities of the backend system 140, such as specific data sources 155 potentially accessible to an API.

In some embodiments, the data type lexicon 225 is assembled from an archive of data requirements and extracted metadata (such as labels associated with certain API calls, input, or output data) from existing APIs. For example, the data type lexicon 225 can be assembled using data from current or past APIs designed for use with the backend system 140 or other APIs generated by the API generation system 130. This historical API data can be combined with a dictionary or glossary of terms (both generic and backend system 140 specific) describing data types, entities within the backend system 140, or desired functionality of an API to generate the entries of the data type lexicon 225 associating a set of terms with a specific data types (including a structure and/or set of fields of the data), actions or functionality of an API, or entities within the backend system 140.

The data requirement module 220 can analyze the partial data requirement and other available data about the API function to identify patterns, key terms, and consistencies which can be mapped to one or more entries of the data type lexicon 225 and added to the complete data requirement for the API function. The data requirement module 220 can use one or more AI processes and/or algorithms to analyze the partial data requirement based on the data type lexicon 225. For example, the data requirement module 220 can use a trained classifier algorithm, a neural network, natural language processing techniques, one or more metrics such as a string distance measurement, or a combination of these techniques to associate parts of the partial data requirement with entries in the data type lexicon 225. After the terms of the partial data requirement are matched with entries in the data type lexicon 225, the matched data type lexicon entries can be used to populate missing fields of the complete data requirement (or to augment or clarify vague disclosure of the partial data requirement). For example, a partial data requirement entry referencing an "address" can be matched to an "Address" data type in the data type lexicon 225 which further defines the structure of an address. Similarly, a partial data requirement entry referencing a "client location" may also be matched to the "Address" data type.

Based on the content of the complete data requirement for an API, the API design module 230 can map the complete data requirement to one or more reference data models and generate an API design for the API based on the reference data models. A reference data model, as used herein, is a standardized model for representing and managing data in the API, and may describe structure and characteristics of one or more types of data used by the backend system 140, for example, a reference data model can define a hierarchy, fields, field characteristics, and/or a schema of a data type represented in the reference data model. For example, a reference data model can contain a hierarchy of specific data types as used by the backend system 140 (or as used by a specific requesting system 160) and can provide a structure to an API designed to interact with resources at different levels of the hierarchy.

In some embodiments, the API design module 230 selects reference data models for an API function based on a comparison between the data requirements of the API and a set of known data models, for example, data models from the reference data model store 235. The API design model 230 can use one or more AI processes and/or algorithms to match the complete data requirement to one or more reference data models. For example, the API design module can use a trained classifier algorithm, a neural network, natural language processing techniques, a search algorithm, one or more metrics such as a string distance measurement, or a combination of these techniques to match a data requirement with reference data models. In some embodiments, a complete data requirement and a corresponding data reference model will have overlapping (or similar) fields, for example, a complete data requirement and a matching data reference model may include a similar set of data types and/or fields.

The reference data model store 235 contains a set of reference data models for mapping to data requirements of one or more functions of an API. The reference data model store is a store, database, or other data storage location operated by the API generation system 130 or the backend system 140, or a third party, according to some embodiments. In some embodiments one or more reference data models of the reference data model store 235 are associated, either explicitly or implicitly (such as through consistent naming), with data types of the data type lexicon 225 or historical APIs of the historical API archive 237.

Based on the mapped reference data models and the data requirements, the API design module 230 can generate an API design defining inputs and outputs for the API function. For example, the API design module 230 can automatically generate an interface design or API shell for the API comprising URI definitions and corresponding data schemas of the functions, API calls, inputs, and outputs of the API (herein, an "API design"). In some implementations, the API design module 230 generates the API design in the form of an API specification for the requested API in RAML (RESTful API Modeling Language), Swagger, or using the OpenAPI standard. A generated API specification can include definitions of the inputs, outputs, URI structure, and data schemas used by the requested API (or of each API function/possible API call of the requested API).

In some embodiments, the API design module 230 uses one or more historical APIs (or historical API designs) to aid in or augment the generation of the API design for the requested API. For example, the API design module can retrieve one or more historical API designs from APIs similar in scope to the requested API, for example based on a having similar data requirements, an association with the same or similar reference data models, similar API functions, similarities to the API design generated by the API design module, or other similarities to the requested API. Historical APIs and/or historical API designs are retrieved from the historical API archive 237, according to some embodiments. An AI technique or algorithm such as a trained machine learning model, classifier, or neural network can be used to select historical API designs relevant to the requested API. The API design module 230 can, in some embodiments, first generate an API design as described above based on mapped reference data models and/or data requirements for the requested API defining one or more URI structures, data schemas, API calls, inputs, or outputs for the requested API. The generated API design can then be matched (using AI techniques or algorithms, as previously described) to one or more historical APIs of the historical API archive 237 interacting with similarly scoped data or otherwise having similar data requirements to the requested API. In some embodiments, the API designs of the matched historical APIs are used by the API design module 230 to revise or update the generated API design. Similarly, the identified overlapping historical API design can be associated with the requested API and later suggested to a human API developer (for example, for use as a reference as the developer modifies the API design generated by the API design module 230).

The historical API archive 237, in the embodiment of FIG. 2, contains data about historical APIs that can be used by the API generation system 130 to inform the generation of new APIs. For example, a historical API can be an API that was previously generated by the API generation system 130, an API currently or previously deployed on a backend system 140 associated with the API generation system 130, or an example API (or partial API) provided to the API generation system from a suitable outside source. In some embodiments, historical APIs can be documented at varying levels of detail in the historical API archive 237. For example, the historical API archive 237 can contain the API design and some or all of the code for a set of historical APIs, from which the API generation system 130 can gather information about the data requirements, API design, and components of each historical API. In some implementations, the data requirements, API design, and components can be separately stored and individually referenced by the API generation system 130 (even if API code for the historical API is not available). Each historical API of the historical API archive 237 can be associated with an identifier common to that API, such that a relevant historical API can be used as a reference throughout the API generation process. For example, the code foundation module 240 can reference components associated with a historical API when selecting components for a requested API based on the historical API being matched to the requested API by the API design module 230.

The code foundation module 240 can generate a code foundation for the API code of a requested API based on the requested API's design, one or more similar historical APIs, and a set of API components, according to some embodiments. As used herein, a code foundation of an API is a shell of the API source code including or associated with a particular set of API components to be used in performing the functionality of the API. An API component, as used herein, is a re-useable software module that may be included in API source code to implement a portion of the functionality of the API. API components may include libraries, algorithms, interfaces with backend systems 140 or data sources 155, middleware components, programming languages and/or frameworks, code segments accomplishing one or more tasks of an API, and other technologies that may interoperate to perform the functionality of the API.

In some implementations, a set of API components available to the code foundation module 240 are stored in the API component library 245. Each API component of the API component library 245 can comprise one or more lines of code accomplishing a function of the API and, in some embodiments, a set of parameters associating the API component with one or more other API components. For example, an API component associated with retrieving data from a data source 155 can include a code segment calling functions authenticating to and accessing a database of the data source 155, as well as parameters associating the API component with access to the data source 155, with a framework in which the code segment is written (for example, if the code is in Java or Node JS), and to a separate component for initializing a library containing the functions called to access the database.

Based on the API design, the code foundation module 240 generates mappings between the inputs and outputs of the functions of an API and one or more backend systems 140 (or specific data sources 155 within the backend systems 140), according to some embodiments. The code foundation module can link a specific input or output to a backend system 140 or data source 155 based on one or more data definitions of the backend system 140 or data source 155 including data or a data type matching one or more inputs or outputs of an API described in the data requirements of the API. In some embodiments, the mappings between inputs or outputs of a requested API and one or more backend systems 140 or specific data sources 155 are stored as an integration pattern component within the code foundation. An integration pattern can describe the types of backend systems 140 or data sources 155 that the API interacts with and/or the backend system 140 or architecture in which the API will be implemented. In embodiments with an integration pattern, the integration pattern can be associated with a set of API components for interfacing the requested API with each individual data source 155 or backend system 140 the requested API will interact with.

In some embodiments, the code foundation module 240 can also recommend which API framework to use for the requested API source code (for example, choosing between a Node JS framework and a Java framework for the API source code). An API framework can be chosen based on the API design (for example, the type or schema of data interacted with), the integration pattern of the API, and/or expected characteristics of the requesting system 160.

The code foundation module 240 can then select additional API components for the code foundation of the API based on the API design, data from the historical API archive 237, and, in some embodiments, the integration pattern or API framework of the API. For example, one or more functions of the API may require translation of data from an input format in the schema of the API call (from the API design) to an output format for accessing a particular data source 155 (from the integration pattern) and a particular component of the API component library 245 can be selected that performs translation of data between these formats. Likewise, an API component may be selected as a data model within the API. In some examples, the code foundation module 240 can select packages or libraries for the API as its components, for example, libraries for technologies used to interface with specific data sources 155. In some implementations, the code foundation module 240 uses an AI technique or algorithm such as a trained machine learning model, classifier, or neural network to select API components for the code foundation. For example, the AI technique or algorithm can be configured to select API components comparing the parameters associated with a potentially includable component with characteristics of the API or of already selected API components (if the API has functions which retrieve data from a data source 155, API components references that data source 155 can be selected). In some embodiments, code associated with a related historical API (for example, a historical API associated with the requested API by the API design module 230) is incorporated into the code foundation for the requested API.

Based on the selected components, API design, and API framework, the code foundation module 240 can generate a code foundation for the requested API. In some implementations, a shell of the API source code for each API function is generated based on the API design and API framework. For each function, the code foundation module 240 augments the shell of the API source code with code segments of the selected components and/or code drawn from an associated historical API to generate the code foundation. For example, the code foundation module 240 can generate source code importing a needed library or mapping inputs to backend outputs based on the selected components. The code foundation module 240 can also insert existing code from historical APIs into the code foundation for the requested API. Code segments from historical APIs can be selected based on the API design for the historical API matching or overlapping with the API design of the requested API.

In some implementations, the code generation module 250 can generate full API source code implementing one or more API functions for the requested API based on the code foundation. In some embodiments, the code generation module 250 can parameterize aspects of the process to generate APIs used as training data and/or building blocks for other APIs. In some implementations, the code generation module 250 additionally generates user interfaces, and/or documentation for the requested API using AI algorithms or techniques. The API source code generated by the code generation module 250 may be useable as generated in some implementations, but in other cases may serve as an initial version of the API source code to be manually revised and verified for correct function. Although some manual revision may be needed (for example to correct bugs or errors), the automated generation of even an initial version of the API source code by the code generation module dramatically speeds the generation of the API source code as a whole, in some embodiments.

Example API Generation Implementation

Figure 3A:
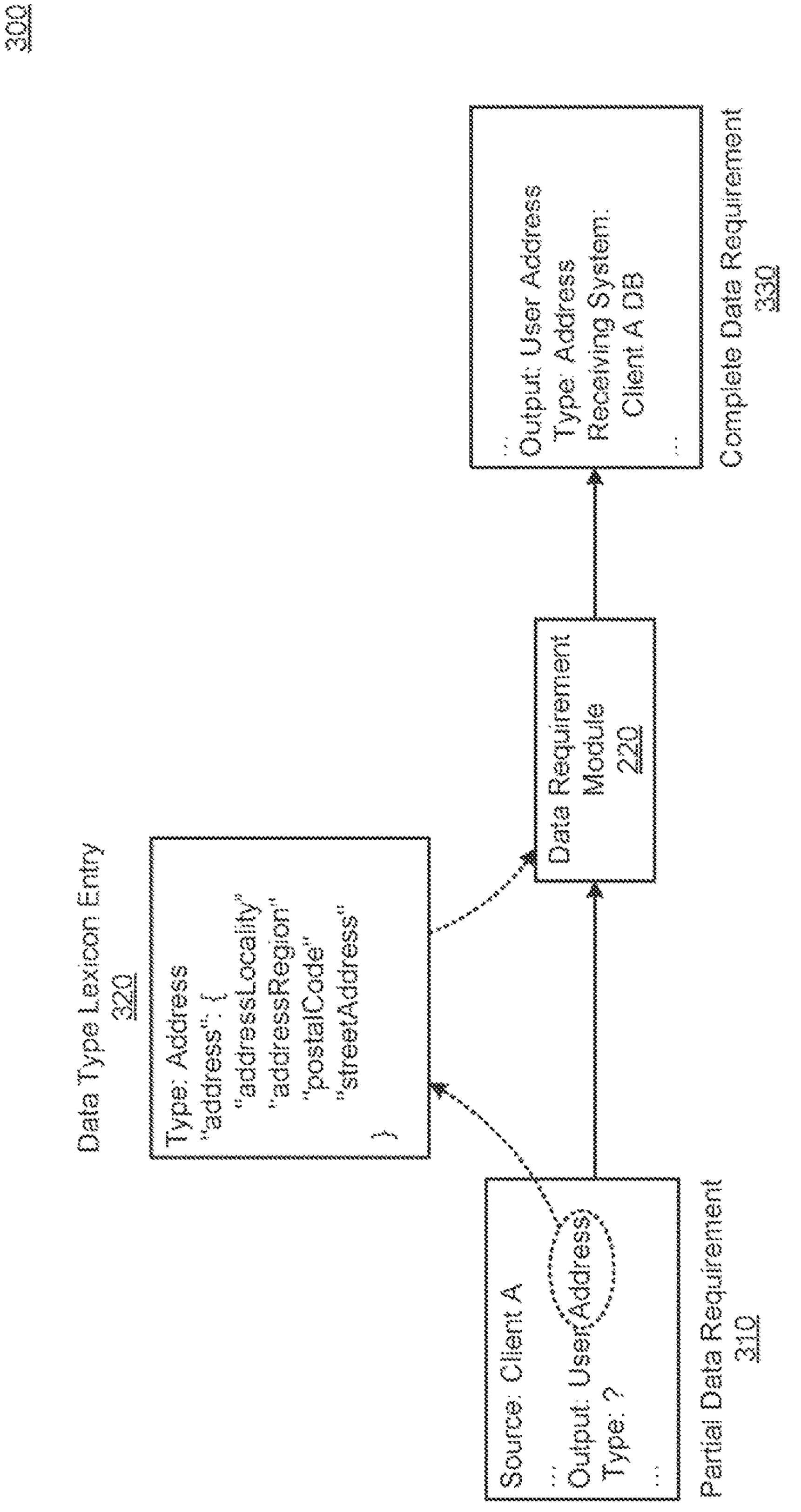
FIG. 3A illustrates determining a complete data requirement for an API function based on a received partial data requirement, according to an embodiment.

FIG. 3A illustrates determining a complete data requirement for an API function based on a received partial data requirement, according to an embodiment. The environment 300 of FIG. 3A illustrates the transformation of a partial data requirement 310 into a complete data requirement 330 based on a data type lexicon entry 320 by the data requirement module 220. As described above, the data requirement module 220 can revise and/or augment a received a partial data requirement (such as the partial data requirement 310) to generate a corresponding complete data requirement (such as the complete data requirement 330) based on data type definitions (such as the data type lexicon entry 320).

In this example, the data requirement module 220 receives a partial data requirement 310 containing output information for a specific API function of a requested API to interact with a client A requesting system 160. Here, the output information for an API function of the partial data requirement 310 is incomplete, including only information that the desired output of the API function is a "user address." In the example of FIG. 3A, only analysis of a single output is shown, but the data requirement module 220 can repeat a similar process for each incomplete input and output of the partial data requirement 310. To infer information about this output for the complete data requirement, the data requirement module 220 can search the data type lexicon 225 for entries of a data type matching the given "user address." In this embodiment, the data type lexicon entry 320 defining an "address" data type is found by the data requirement module 220. As described above, this data type definition can define a structure and/or set of expected fields for data of that data type. Here, the data type lexicon entry 320 defines the "address" data type as including a series of four fields (the "addressLocality," "addressRegion," "postalCode," and "streetAddress") for data of the "address" data type. In some implementations, the data type lexicon entry 320 can further define each of the four fields, for example, by defining each as text data (or a string).

Using the data type lexicon entry 320, the "address" data type can be added to the partial data requirement 310. The data requirement module 220 can repeat this process for other incomplete fields of the partial data requirement 310, for example by adding the expected receiving system to the output, and similarly augmenting the partial data requirement 310 for other API functions of the requested API. Once the data requirement module 220 has analyzed and augmented each field of the partial data requirement 310 (for example, by adding the "address" data type to the output as shown), the resulting complete data requirement 330 can be saved for later use when generating the requested API.

Figure 3B:
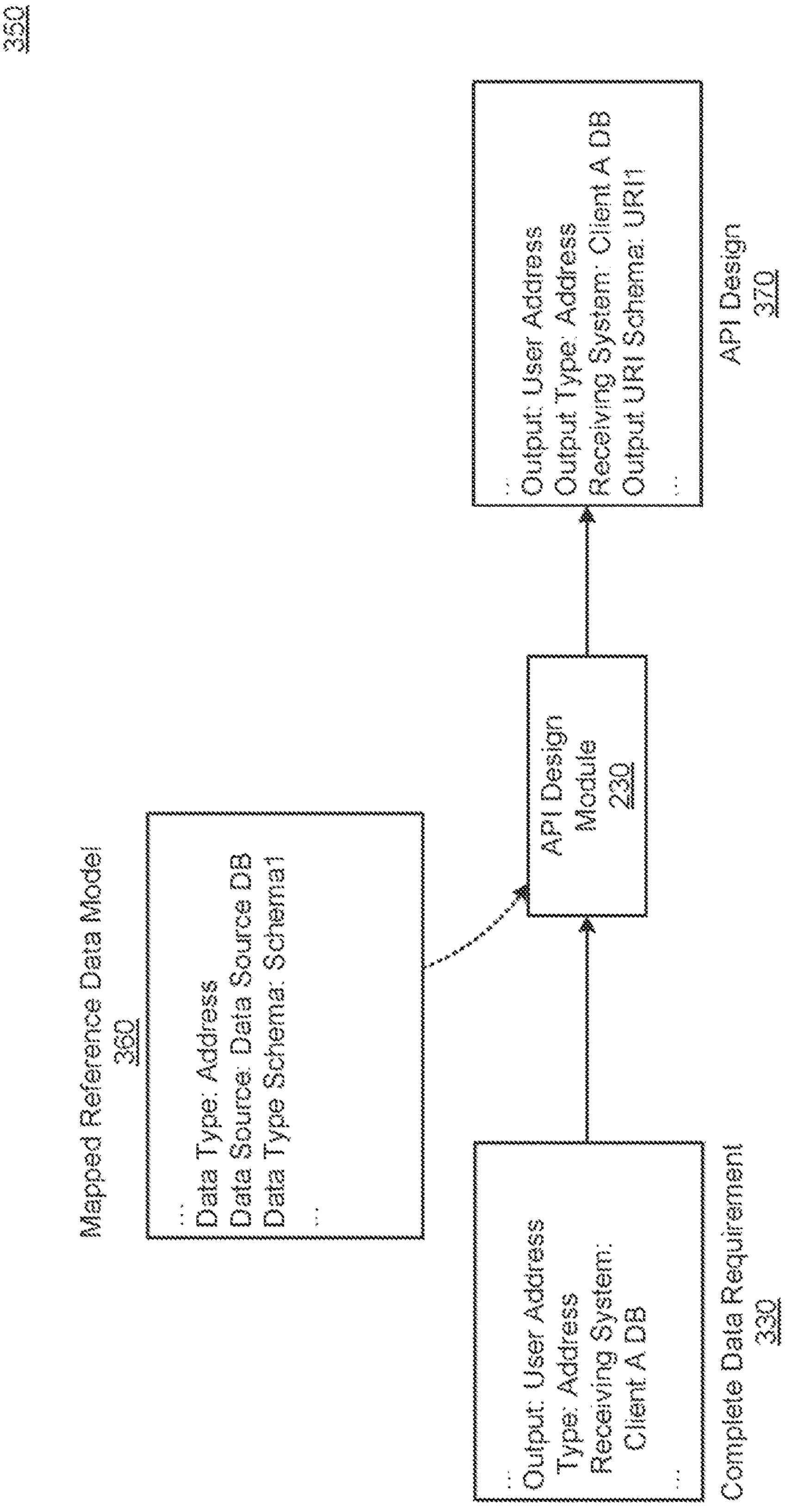
FIG. 3B illustrates generating an API design from a data requirement for an API function, according to an embodiment.

FIG. 3B illustrates generating an API design from a data requirement for an API function, according to an embodiment. The environment 350 of FIG. 3B illustrates the generation of an API design 370 by the API design module 230 based on a complete data requirement 330 and a mapped reference data model 360. As described above, the API design module 230 can generate an API design including definitions of the inputs, outputs, and URI structure, and data schemas for use by the requested API. In the embodiment of FIG. 3B, the received complete data requirement 330 defines a desired output and data type (a "user address" of the "address" data type), but does not include a URI design or schema for transmitting the user address information in response to an API call.

Therefore, the API design module 230 can map the output to the mapped reference data model 360. Here, the mapped reference data model 360, defines a schema (labeled "schema1" in FIG. 3B) of the "address" data type as used by a specific database of a data source 155. In some implementations, the "address" data type is standardized to the schema defined by the mapped reference data model 360 across the backend system 140. Using the schema from the mapped reference data model 360 in combination with the information from the complete data requirement 330, the API design module 230 can populate the fields of the API design 370 for that output. In some implementations, the generated API design 370 is a RAML or Swagger API specification in a separate format from the complete data requirement 330, as described above.

Method of API Generation

Figure 4:
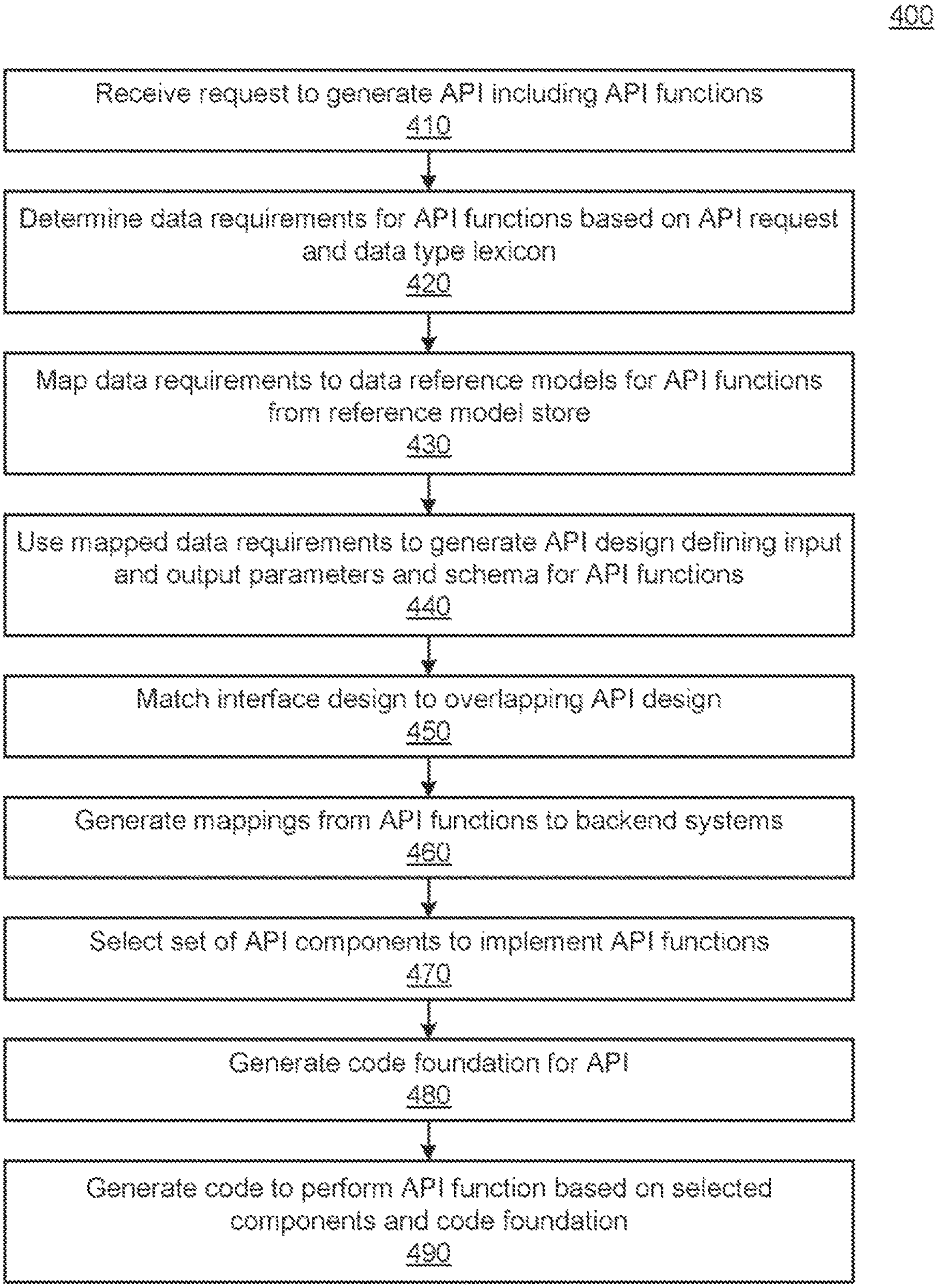
FIG. 4 is a flowchart illustrating an example process for generating an API including an API function based on a received API generation request, according to an embodiment.

FIG. 4 is a flowchart illustrating an example process for generating an API including API functions based on a received API generation request, according to an embodiment. The process 400 of FIG. 4 begins when an API generation system receives 410 a request to generate an API including a set of API functions. As described above, each requested API can comprise a set of functions, which can have individual inputs and outputs. Based on the received request, the API generation system determines 420 a set of data requirements for each API function of the API based on information in the API generation request and a data type lexicon defining data types. As described above a request module can extract a partial data requirement from the received API generation request and a data requirement module can augment the partial data requirement with data from the data type lexicon.

The API generation system then maps 430 one or more data requirements to data reference models from a data reference model store. Here, data types of various inputs and outputs of the API can be mapped to data references models defining standardized ways the backend system the API will be implemented on handles those data types (such as a schema for data of that data type. Using the data requirements and mapped data reference models, the API generation system can generate 440 an API design defining input and output parameters and schema for the API functions of the API. As described above, the API design can include a RAML, Swagger, or OpenAPI API specification including definitions of the inputs, outputs, URI structure, and data schemas used by the requested API. In some implementations, the requested API can be matched 450 to one or more similar historical APIs based on the API design.

After the API design for the API is created, the API generation system generates 460 mappings between API functions and backend systems relevant to the desired functions. For example, an API function to retrieve a certain class of data can be mapped to the backend system containing the database where that data is stored. Similarly, the API generation system selects 470 a set of API components which each contain code to implement portions of an API function (for example, importing a library or accessing a database). Based on the API components, the API generation system generates 480 a code foundation for the API which can include a shell of the API source code for each API function. Finally, the API generation module generates 490 API source code to perform API function based on the selected API components and previously generated code foundation.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:

a processor; and a non-transitory computer readable storage medium comprising instructions which, when executed by the processor, causes the processor to perform the steps of:

receiving API descriptive data including partial data requirements for an API, the partial data requirements comprising vague data requirements lacking a corresponding full definition of data fields from a lexicon for an API function of the API;

maintaining a data type lexicon constructed based on data requirements of a set of existing APIs of a backend system, the data type lexicon comprising a set of data type definitions used by the backend system;

matching one or more inputs or outputs described in the partial data requirements to data types of the data type definitions of the data type lexicon; and revising the partial data requirements to generate a complete set of data requirements for the API, the complete set of data requirements defining one or more inputs and outputs for the API function based on the matched data types, wherein the complete set of data requirements includes one or more fields missing from the partial data requirements.

2. The system of claim 1, wherein the instructions further cause the processor to generate source code for the API based at least in part on the complete set of data requirements.

3. The system of claim 1, wherein the instructions further cause the processor to determine one or more input and output parameters for the API function based on a reference data model associated with a data type used by the API function.

4. The system of claim 3, wherein determining one or more input and output parameters for the API function comprises generating an API specification for the API.

5. The system of claim 4, wherein the API specification is an API specification based on a standard selected from the set consisting of RAML (RESTful API Modeling Language), Swagger, and OpenAPI specification.

6. The system of claim 4, wherein the instructions further cause the processor to determine a framework for source code associated with the API based on the API specification.

7. The system of claim 6, wherein the instructions further cause the processor to assemble a code foundation comprising one or more software components implementing the API function.

8. The system of claim 7, wherein a software component of the one or more software components comprises a code segment for importing a library.

9. The system of claim 7, wherein a software component of the one or more software components comprises a code segment for translating data from an input format to an output format.

10. The system of claim 1, wherein the instructions further cause the processor to extract from the API descriptive data from the partial data requirements.

11. The system of claim 1, wherein the API is to be implemented on the backend system and the instructions further cause the processor to determine one or more input and output parameters for the API function based on a reference data model, the reference data model defining a schema of the data type as used in the backend system.

12. A method comprising:

receiving API descriptive data including partial data requirements for an API, the partial data requirements comprising vague data requirements lacking a corresponding full definition of data fields from a lexicon for an API function of the API;

maintaining a data type lexicon constructed based on data requirements of a set of existing APIs of a backend system, the data type lexicon comprising a set of data type definitions used by the backend system;

matching one or more inputs or outputs described in the partial data requirements to data types of the data type definitions of the data type lexicon; and revising the partial data requirements to generate a complete set of data requirements for the API, the complete set of data requirements defining one or more inputs and outputs for the API function based on the matched data types, wherein the complete set of data requirements includes one or more fields missing from the partial data requirements.

13. The method of claim 12, further comprising generating source code for the API based at least in part on the complete set of data requirements.

14. The method of claim 12, further comprising determining one or more input and output parameters for the API function based on a reference data model associated with a data type used by the API function.

15. The method of claim 14, wherein determining one or more input and output parameters for the API function comprises generating an API specification for the API.

16. The method of claim 15, wherein the API specification is an API specification based on a standard selected from the set consisting of RAML (RESTful API Modeling Language), Swagger, and OpenAPI specification.

17. The method of claim 15, further comprising determining a framework for source code associated with the API based on the API specification.

18. The method of claim 17, further comprising assembling a code foundation comprising one or more software components implementing the API function.

19. The method of claim 18, wherein a software component of the one or more software components comprises a code segment for importing a library.

20. The method of claim 18, wherein a software component of the one or more software components comprises a code segment for translating data from an input format to an output format.

21. The method of claim 12, further comprising extracting from the API descriptive data from the partial data requirements.

22. The method of claim 12, wherein the API is to be implemented on the backend system and wherein determining one or more input and output parameters for the API function based on a reference data model, the reference data model defining a schema of the data type as used in the backend system.

* * * * *